(12) United States Patent
Magson et al.

(10) Patent No.: US 9,752,878 B2
(45) Date of Patent: Sep. 5, 2017

(54) UNMANNED AERIAL VEHICLE CONTROL HANDOVER PLANNING

(71) Applicant: Sikorsky Aircraft Corporation, Stratford, CT (US)

(72) Inventors: James S. Magson, North Haven, CT (US); Gary Howland, Stratford, CT (US); Cherry Cwalina, San Diego, CA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/953,978

(22) Filed: Nov. 30, 2015

(65) Prior Publication Data

US 2016/0161258 A1 Jun. 9, 2016

Related U.S. Application Data

(60) Provisional application No. 62/089,289, filed on Dec. 9, 2014.

(51) Int. Cl.
| | |
|---|---|
| *G01C 21/00* | (2006.01) |
| *B64C 39/02* | (2006.01) |
| *G05D 1/12* | (2006.01) |
| *G05D 21/00* | (2006.01) |
| *G08G 5/00* | (2006.01) |

(Continued)

(52) U.S. Cl.
CPC ............ *G01C 21/00* (2013.01); *B64C 39/024* (2013.01); *G05D 1/0022* (2013.01); *G05D 1/104* (2013.01); *G05D 1/12* (2013.01); *G05D 21/00* (2013.01); *G08G 5/006* (2013.01); *B64C 2201/146* (2013.01)

(58) Field of Classification Search
None
See application file for complete search history.

(56) References Cited

U.S. PATENT DOCUMENTS 6,122,572 A * 9/2000 Yavnai ................. G05D 1/0088
342/13
7,451,023 B2 11/2008 Appleby et al.
(Continued)

OTHER PUBLICATIONS

Anonymous, "Operational Scenario—Handover Team to Team", XP-55264301, Oct. 26, 2012, pp. 1-5.
(Continued)

*Primary Examiner* — Fadey Jabr
*Assistant Examiner* — Kevin P Mahne
(74) *Attorney, Agent, or Firm* — Cantor Colburn LLP

(57) ABSTRACT

Control handover planning for an unmanned aerial vehicle (UAV) is provided that includes determining, by a planning system, a current location of a mobile control system and a current location of the UAV. A target location is identified. A control handover zone is determined based on a communication range constraint between the mobile control system and the UAV. The control handover zone is located between the current location of the mobile control system, the current location of the UAV, and the target location. A mobile control system path plan and a UAV path plan are created that each includes a control handover waypoint in the control handover zone at the same time. The control handover waypoint defines a planned location to place the mobile control system in control of the UAV.

15 Claims, 4 Drawing Sheets

(51) Int. Cl.
    *G05D 1/00*     (2006.01)
    *G05D 1/10*     (2006.01)

(56) References Cited

U.S. PATENT DOCUMENTS

| | | | |
|---|---|---|---|
| 8,713,215 B2 | 4/2014 | Wade et al. | |
| 8,983,682 B1* | 3/2015 | Peeters | B64C 39/024 244/190 |
| 9,262,929 B1* | 2/2016 | Roy | G08G 5/0034 |
| 9,505,383 B2* | 11/2016 | Peel | B60T 7/16 |
| 2007/0018052 A1* | 1/2007 | Eriksson | G05D 1/0044 244/190 |
| 2008/0201024 A1* | 8/2008 | Matos | G05D 1/0011 701/2 |
| 2009/0210109 A1* | 8/2009 | Ravenscroft | G01C 21/005 701/26 |
| 2010/0017046 A1* | 1/2010 | Cheung | G01S 7/003 701/2 |
| 2010/0084513 A1* | 4/2010 | Gariepy | B64C 39/024 244/190 |
| 2010/0302359 A1* | 12/2010 | Adams | B64C 39/024 348/117 |
| 2011/0208373 A1 | 8/2011 | Lees et al. | |
| 2012/0095619 A1* | 4/2012 | Pack | G05D 1/0038 701/2 |
| 2012/0123668 A1* | 5/2012 | Spinelli | G05D 1/104 701/120 |
| 2013/0035805 A1* | 2/2013 | Spinelli | G05D 1/0061 701/2 |
| 2013/0345920 A1* | 12/2013 | Duggan | G05D 1/0061 701/23 |
| 2014/0018979 A1* | 1/2014 | Goossen | G08G 5/0034 701/3 |
| 2014/0316616 A1* | 10/2014 | Kugelmass | G05D 1/101 701/8 |
| 2015/0063202 A1* | 3/2015 | Mazzarella | H04B 7/18504 370/316 |
| 2015/0066248 A1* | 3/2015 | Arbeit | G01C 21/20 701/2 |
| 2015/0236780 A1* | 8/2015 | Jalali | H04W 84/06 455/13.4 |
| 2015/0370251 A1* | 12/2015 | Siegel | G05D 1/0027 701/2 |
| 2016/0107750 A1* | 4/2016 | Yates | B64C 39/024 244/2 |
| 2016/0117936 A1* | 4/2016 | Klinger | G08G 1/162 701/3 |
| 2016/0140851 A1* | 5/2016 | Levy | G08G 5/0069 701/3 |
| 2016/0196525 A1* | 7/2016 | Kantor | G08G 5/0013 705/330 |
| 2016/0196756 A1* | 7/2016 | Prakash | B64C 39/024 701/3 |

OTHER PUBLICATIONS

Balinda Moreland et al., "Hunter Standoff Killer Team (HSKT) Ground and Flight Test Results", XP-055265801, Proceedings of SPIE, vol. 6578 657813, Apr. 27, 2007, pp. 1-14.

Tobias Paul et al., "Operational Considerations for Teaming Manned and Unmanned Helicopter", XP035138495, Journal of Intelligent and Robotic Systems (2013), vol. 69, pp. 33-40.

Steve Jameson et al., "Collaborative Autonomy for Manned/Unmanned Teams", XP-002756607, American Helicopter Society 61st Annual Forum, Grapevine, Texas, Jun. 1-3, 2005, pp. 1-8.

* cited by examiner

UNMANNED AERIAL VEHICLE CONTROL HANDOVER PLANNING

CROSS REFERENCE TO RELATED APPLICATIONS

This application claims priority to U.S. Provisional Application No. 62/089,289, filed Dec. 9, 2014, which is incorporated herein by reference in its entirety.

BACKGROUND OF THE INVENTION

The subject matter disclosed herein generally relates to path planning systems, and more particularly to planning of coordinated efforts between a mobile control system and an unmanned aerial vehicle.

Unmanned aerial vehicles (UAVs) can be used in a variety of missions to perform scouting and reconnaissance operations in potentially hostile environments. A UAV can be remotely controlled by a fixed-location control station requesting a particular flight path as a path plan which can include a number of waypoints that define location and timing constraints. Commands may be relayed to the UAV as high-level instructions, such as maintaining 500-meter loiter flight pattern about a designated location. Onboard navigation and control computers on the UAV convert a high-level path plan into a more detailed plan to drive control and propulsion systems of the UAV such that location and timing constraints of the waypoints can be met. UAVs typically include a number of perception sensors that may capture video data, terrain data, and other local environment data. A live data feed from the perception sensors typically involves a high-bandwidth link that may be range limited. In one example, a high-bandwidth link is implemented using a line-of-sight communication system. Line-of-sight based communications may also be used to minimize the risk of signal interception by a potentially hostile party.

When another vehicle, such as a helicopter, desires to take control of an airborne UAV to observe perception sensor data and/or modify the planned path of the UAV, the control handover process from the fixed-location control station to the vehicle can be constrained by the relative positions of the vehicle and the UAV. Where communication between the vehicle and UAV is constrained by distance or line-of-sight, the ability of the vehicle to establish contact with the UAV is limited until the vehicle is within range of the UAV. Efficiently reaching an in-range condition can be challenging when the vehicle and the UAV are both in motion.

BRIEF DESCRIPTION OF THE INVENTION

According to an aspect of the invention, a method of control handover planning for an unmanned aerial vehicle (UAV) is provided that includes determining, by a planning system, a current location of a mobile control system and a current location of the UAV. A target location is identified. A control handover zone is determined based on a communication range constraint between the mobile control system and the UAV. The control handover zone is located between the current location of the mobile control system, the current location of the UAV, and the target location. A mobile control system path plan and a UAV path plan are created that each includes a control handover waypoint in the control handover zone at the same time. The control handover waypoint defines a planned location to place the mobile control system in control of the UAV.

In addition to one or more of the features described above or below, or as an alternative, further embodiments could include communicating the mobile control system path plan to a navigation system of the mobile control system.

In addition to one or more of the features described above or below, or as an alternative, further embodiments could include communicating the UAV path plan to a control station that controls the UAV prior to control handover.

In addition to one or more of the features described above or below, or as an alternative, further embodiments could include where the mobile control system receives control of the UAV from the control station based on the mobile control system and the UAV reaching the control handover zone.

In addition to one or more of the features described above or below, or as an alternative, further embodiments could include determining path planning constraints including one or more avoidance zones, and creating the mobile control system path plan and the UAV path plan based on the path planning constraints.

In addition to one or more of the features described above or below, or as an alternative, further embodiments could include receiving an initial mobile control system path plan between the current location of the mobile control system and the target location, receiving an initial UAV path plan between the current location of the UAV and the target location, and determining whether the initial mobile control system path plan and the initial UAV path plan meet the communication range constraint. The control handover waypoint for the mobile control system and the control handover waypoint for the UAV can be defined based upon respective locations in one or more of the initial mobile control system path plan and the initial UAV path plan where the communication range constraint is expected to be met.

In addition to one or more of the features described above or below, or as an alternative, further embodiments could include adjusting one or more of the initial mobile control system path plan and the initial UAV path plan to form the mobile control system path plan and the UAV path plan based on determining that the initial mobile control system path plan and the initial UAV path plan do not meet the communication range constraint.

In addition to one or more of the features described above or below, or as an alternative, further embodiments could include periodically re-computing the mobile control system path plan and the UAV path plan as the mobile control system and the UAV are in motion; and based on re-computing the mobile control system path plan and the UAV path plan, determining whether a change in location or timing of the control handover waypoint for the mobile control system or the UAV results therefrom.

In addition to one or more of the features described above or below, or as an alternative, further embodiments could include creating the mobile control system path plan and the UAV path plan further includes ensuring that the UAV is scheduled reach the target location prior to the mobile control system reaching the target location and after control of the UAV is scheduled to be transferred to the mobile control system.

In addition to one or more of the features described above or below, or as an alternative, further embodiments could include where the planning system is onboard the mobile control system, the mobile control system is a helicopter, and the communication range constraint between the mobile control system and the UAV is based on line-of-sight communication between the mobile control system and the UAV.

According to further aspects of the invention, a planning system for control handover planning for a UAV is provided. The planning system includes a processor and memory having instructions stored thereon that, when executed by the processor, cause the planning system to determine a current location of a mobile control system and a current location of the UAV. A target location is identified. A control handover zone is determined based on a communication range constraint between the mobile control system and the UAV. The control handover zone is located between the current location of the mobile control system, the current location of the UAV, and the target location. A mobile control system path plan and a UAV path plan are created that each includes a control handover waypoint in the control handover zone at the same time. The control handover waypoint defines a planned location to place the mobile control system in control of the UAV.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a planning system performs control handover planning to transition control of an unmanned aerial vehicle (UAV) from a fixed-position control station to a mobile control system. The mobile control system can be any type of vehicle, such as an aircraft, a ground-based vehicle, or watercraft. In one embodiment, the mobile control system is a helicopter with the planning system onboard.

Figure 1:
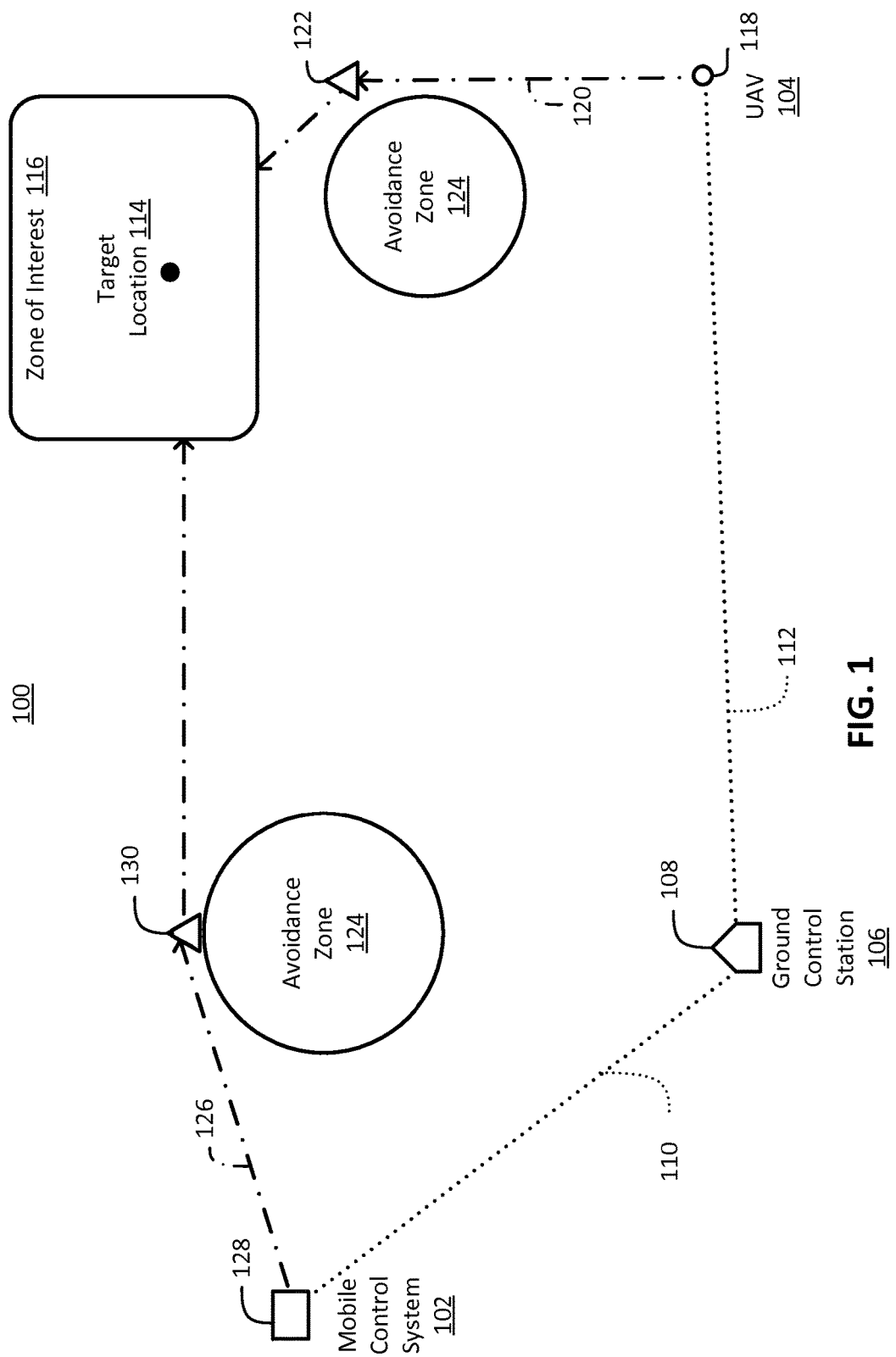
FIG. 1 schematically depicts a mobile control system preparing to team with a UAV in accordance with an embodiment.

FIG. 1 schematically depicts a configuration 100 of a mobile control system 102 preparing to team with a UAV 104. Initially, the UAV 104 is controlled using a ground control station 106 at a substantially fixed location 108. The ground control station 106 can send a sequence of commands to instruct the UAV 104 to travel to one or more specific locations and/or to establish a desired flight pattern, such as circling a perimeter surrounding a particular location. The ground control station 106 may establish a mobile control system communication channel 110 with respect to the mobile control system 102 and a UAV communication channel 112 with respect to the UAV 104. The mobile control system communication channel 110 may be a radio communication link that enables voice communication between an operator of the mobile control system 102 and an operator of the ground control station 106. The UAV communication channel 112 may be a data link that enables the operator of the ground control station 106 to issue control commands and receive status information from the UAV 104. In one embodiment, mobile control system 102 is unable to use the mobile control system communication channel 110 to directly communicate with the UAV 104 at substantial distances. Furthermore, the mobile control system communication channel 110 may not have sufficient bandwidth or support a communication protocol that would enable the ground control station 106 to act as a repeater or to relay all data transmitted from the UAV 104.

The UAV 104 can include one or more perception sensors (not depicted), such as one or more video cameras, LIght Detection and Ranging scanners (LIDAR), LAser Detection and Ranging scanners (LADAR), RAdio Detection And Ranging (RADAR), and other sensor types known in the art. In an embodiment, in order for the mobile control system 102 to receive perception sensor data from the UAV 104 and/or control the UAV 104, the mobile control system 102 and UAV 104 must be within a communication range constraint. For example, direct communication between the mobile control system 102 and the UAV 104 may be limited by a line-of-sight communication system. In an embodiment, when an operator of the mobile control system 102 desires to send the UAV 104 ahead to observe a target location 114 in a zone of interest 116 prior to the mobile control system 102 reaching the zone of interest 116, the mobile control system 102 can contact the ground control station 106 to initiate a control handover process. The ground control station 106 may respond by providing the mobile control system 102 with a current location 118 of the UAV 104 and an initial UAV path plan 120 that includes one or more initial UAV waypoints 122. The zone of interest 116 may be a battle zone where assistance, such as a medical evacuation is needed at the target location 114, e.g., a point of injury. The initial UAV path plan 120 may be determined by a computer system of the ground control station 106 or onboard the UAV 104 based on available information about one or more avoidance zones 124 between the current location 118 of the UAV 104 and the target location 114. The avoidance zones 124 may be any type of obstacle or hazard that degrades communication or places the UAV 104 and/or the mobile control system 102 at risk of harm. For example, avoidance zones 124 can include terrain or man-made objects that have their locations and dimensions documented within a map.

The mobile control system 102 has or receives an initial mobile control system path plan 126 between a current location 128 of the mobile control system 102 and the target location 114. A planning system or other computer system may initially determine the initial mobile control system path plan 126 based on available information about one or more avoidance zones 124 between the current location 128 of the mobile control system 102 and the target location 114. Similar to the initial UAV path plan 120, the initial mobile control system path plan 126 can include one or more initial mobile control system waypoints 130. The waypoints 122 and 130 can define location and timing constraints along the respective path plans 120 and 126, where the mobile control system 102 and UAV 104 are expected to reach a specific location at a predetermined time based on distance, direction, and speed traveled. The waypoints 122 and 130 may also indicate path inflection points where a change in trajectory is expected to occur.

In order for the mobile control system 102 to take control of the UAV 104 from the ground control station 106, the mobile control system 102 must be within communication range of the UAV 104. If the operator of the mobile control system 102 desires to have control handover occur prior to reaching the zone of interest 116 such that a data feed, e.g., a video stream, can be sent from the UAV 104 back to the mobile control system 102, the initial UAV path plan 120 and/or the initial mobile control system path plan 126 may need to be modified such that the mobile control system 102 and the UAV 104 achieve physical proximity at an earlier junction. In an exemplary embodiment, a planning system determines a mobile control system path plan and a UAV path plan that establishes control handover waypoints for the mobile control system 102 and the UAV 104 as further depicted in FIG. 2.

Figure 2:
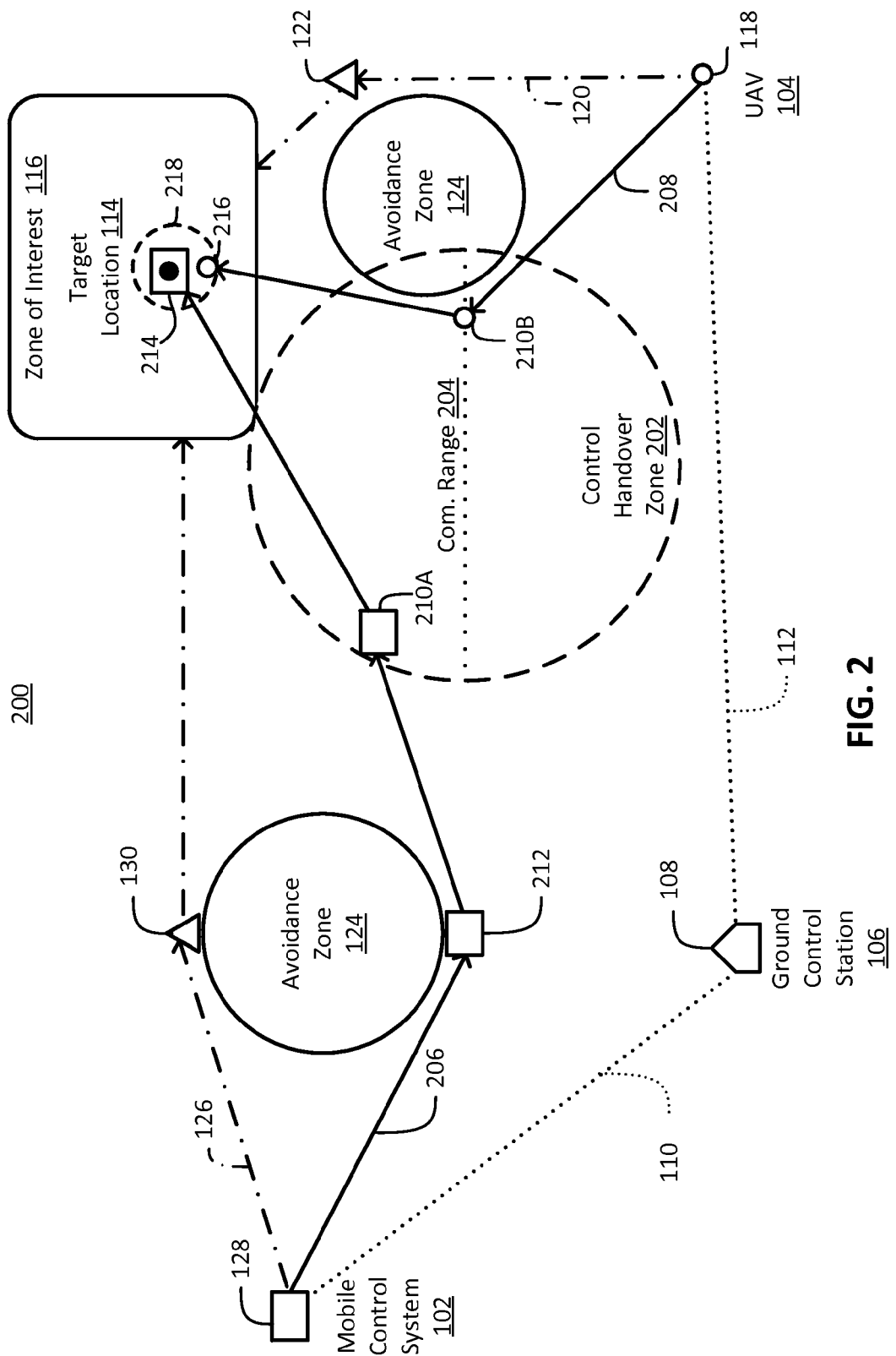
FIG. 2 schematically depicts a teaming plan of the mobile control system and UAV of FIG. 1 in accordance with an embodiment.

FIG. 2 schematically depicts a configuration 200 for a teaming plan of the mobile control system 102 and the UAV 104 of FIG. 1. In the example of FIG. 2, a planning system (e.g., planning system 300 of FIG. 3) determines a control handover zone 202 based on a communication range constraint 204 between the mobile control system 102 and the UAV 104. The control handover zone 202 is located between the current location 128 of the mobile control system 102, the current location 118 of the UAV 104, and the target location 114. The planning system can create a mobile control system path plan 206 and a UAV path plan 208 that each includes a control handover waypoint 210 in the control handover zone 202 at the same time. Control handover waypoint 210A defines a planned location of the mobile control system 102, and control handover waypoint 210B defines a planned location of the UAV 104 to place the mobile control system 102 in control of the UAV 104. The path plans 206 and 208 can include one or more additional waypoints. For example, the mobile control system path plan 206 may include one or more intermediate waypoints 212 and a final waypoint 214 in the zone of interest 116 substantially near the target location 114. Similarly, the UAV path plan 208 can include one or more intermediate waypoints (not depicted) and a final waypoint 216 in the zone of interest 116 substantially near the target location 114. The final waypoint 216 need not be a precise static location; rather, the final waypoint 216 can be a flight transition point of the UAV 104 to establish a loiter zone 218 about the target location 114.

Upon determining the mobile control system path plan 206, the planning system can communicate the mobile control system path plan 206 to a navigation system of the mobile control system 102. Additionally, the planning system can communicate the UAV path plan 208 to the ground control station 106 that controls the UAV 104 prior to control handover. The ground control station 106 can use the UAV communication channel 112 to relay the UAV path plan 208 to the UAV 104 and replace the initial UAV path plan 120 if needed. If an existing waypoint of either the initial UAV path plan 120 or the initial mobile control system path plan 126 is in the control handover zone 202, then creating a respective mobile control system path plan 206 or UAV path plan 208 may simply involve tagging an existing waypoint as a control handover waypoint 210. However, if either of the initial UAV path plan 120 or the initial mobile control system path plan 126 does not pass through the control handover zone 202, then more substantial path plan changes are need.

The planning system may consider a number of factors in determining where the control handover zone 202 should be placed, such as motion constraints of the mobile control system 102 and the UAV 104, locations of one or more avoidance zones 124, the current location 128 of the mobile control system 102, the current location 118 of the UAV 104, the target location 114, and/or the zone of interest 116. The control handover zone 202 and the control handover waypoints 210A, 210B can be computed to ensure that the UAV 104 is scheduled reach the target location 114 prior to the mobile control system 102 reaching the target location 114 and after control of the UAV 104 is scheduled to be transferred to the mobile control system 102.

Figure 3:
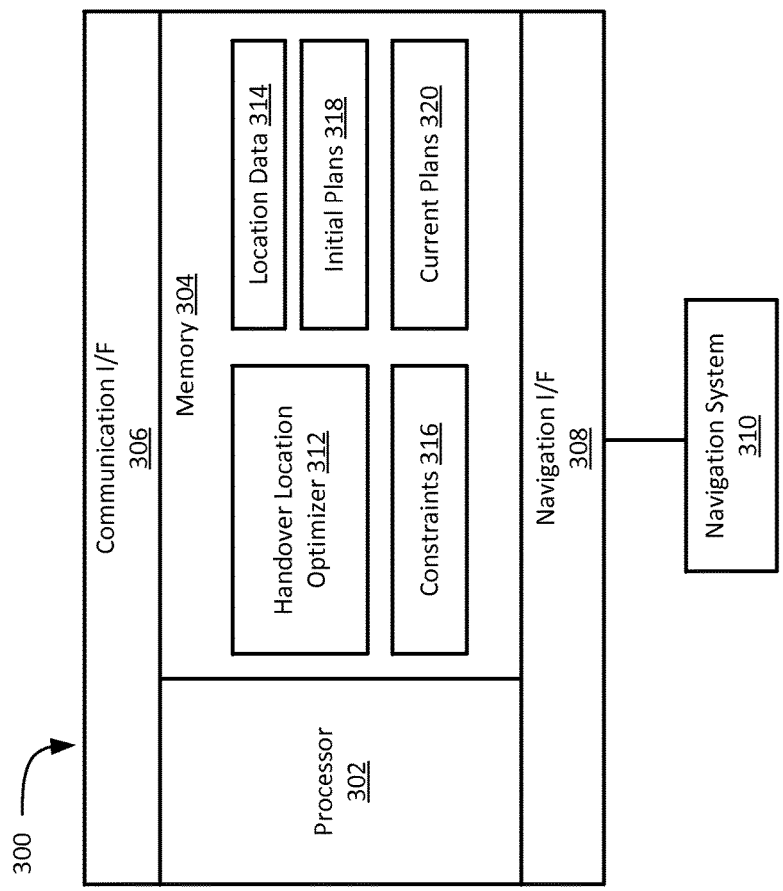
FIG. 3 schematically depicts a block diagram of a planning system for UAV control handover planning in accordance with embodiments.

FIG. 3 schematically depicts a block diagram of a planning system 300 for UAV control handover planning in accordance with embodiments. The planning system 300 can be part of the mobile control system 102 of FIGS. 1 and 2, or implemented at a separate location apart from the mobile control system 102. By including the planning system 300 as part of the mobile control system 102, further monitoring can be performed and updates sent directly to the UAV 104 after control handover occurs as the mobile control system 102 and UAV 104 collectively move further from the ground control station 106 of FIGS. 1 and 2, e.g., monitoring movement of the target location 114 and/or changes in avoidance zones 124.

In the example of FIG. 3, the planning system 300 includes a processor 302, memory 304, and a communication interface 306. The planning system 300 may also include a navigation interface 308 where the planning system 300 provides a path plan to a navigation system 310, such as a navigation system of the mobile control system 102 of FIGS. 1 and 2. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the planning system 300 including executable instructions stored therein, for instance, as firmware. Examples of instructions that can be stored in the memory 304 for execution by the processor 302 include a handover location optimizer 312.

The handover location optimizer 312 can interface with a number of data structures in the memory 304, such as location data 314, constraints 316, initial plans 318, and current plans 320. The location data 314 can include a current location of the mobile control system 102, a current location of the UAV 104, and a target location 114 of FIGS. 1 and 2. The location data 314 can be received via the communication interface 306 and/or the navigation interface 308. The constraints 316 can include constraints related to the mobile control system 102, the UAV 104, communication range, path planning, and the like. The constraints 316 can be stored based on predetermined system configuration information or dynamically updated as values are received or learned, such as an actual communication range between the mobile control system 102 and the UAV 104 at a bandwidth necessary to provide control and real-time perception sensor data. The initial plans 318 may be received via the communication interface 306 and/or the navigation interface 308 for the mobile control system 102 and the UAV 104. In one embodiment, the ground control station 106 of FIGS. 1 and 2 provides the initial plans 318. The current plans 320 can be determined as a list of one or more waypoints for the mobile control system 102 and the UAV 104 to reach the control handover waypoints 210A, 210B and the target location 114 of FIG. 2.

Figure 4:
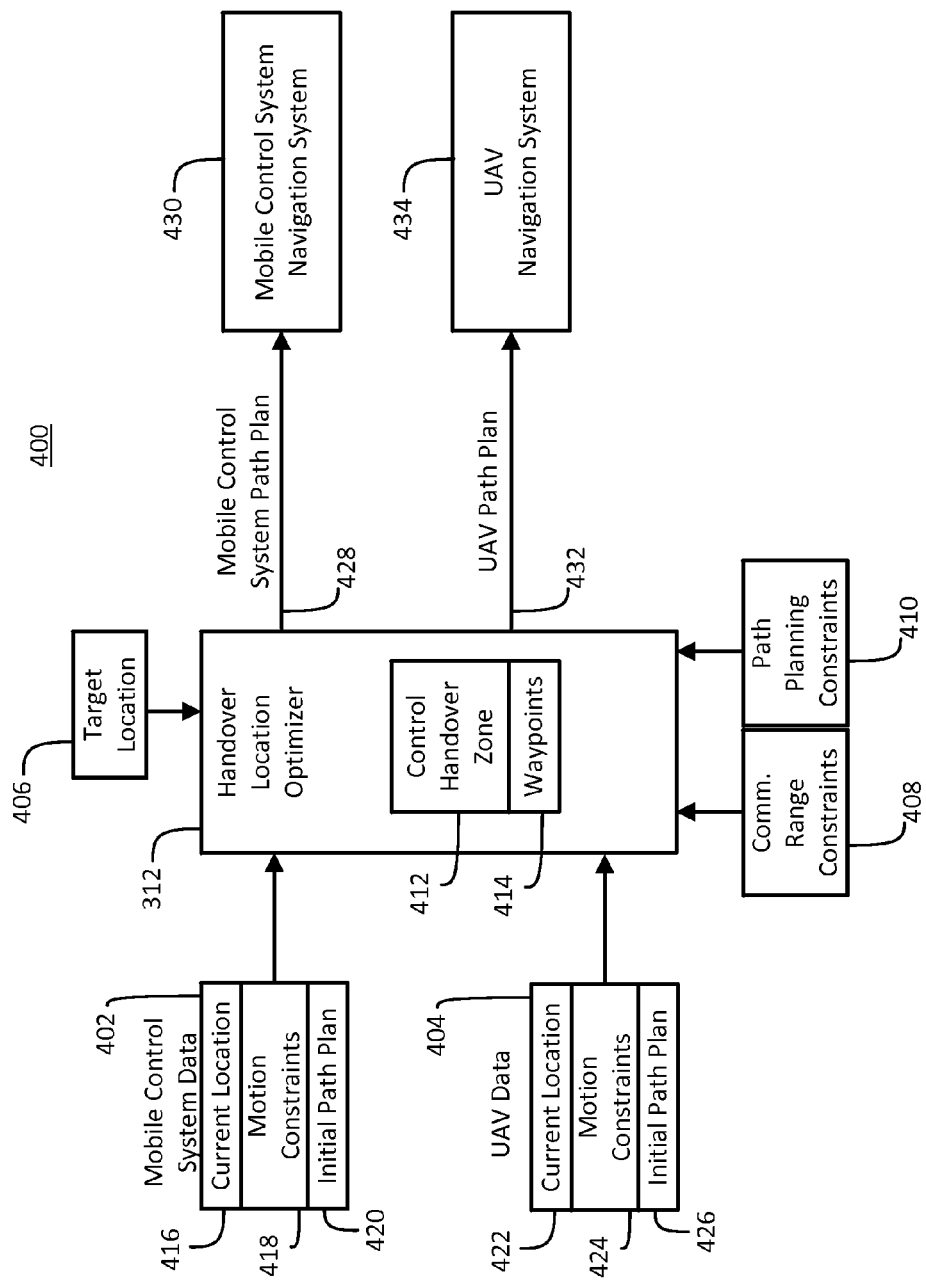
FIG. 4 schematically depicts a block diagram of data flow for UAV control handover planning in accordance with embodiments.

FIG. 4 schematically depicts a block diagram of data flow 400 for UAV control handover planning in accordance with embodiments. The data flow 400 can be implemented in the planning system 300 of FIG. 3. In the data flow 400, the handover location optimizer 312 receives mobile control system data 402, UAV data 404, a target location 406, communication range constraints 408, and path planning constraints 410 to determine a control handover zone 412 and a plurality of waypoints 414. The mobile control system data 402 may include a current location 416 of the mobile control system 102 of FIGS. 1 and 2, motion constraints 418 of the mobile control system 102, and an initial mobile control system path plan 420. The UAV data 404 may include a current location 422 of the UAV 104 of FIGS. 1 and 2, motion constraints 424 of the UAV 104, and an initial UAV path plan 426.

The handover location optimizer 312 of the planning system 300 of FIG. 3 can determine the current location 416 of the mobile control system 102 of FIGS. 1 and 2 and a current location 422 of the UAV 104 of FIGS. 1 and 2 based on data received via the communication interface 306 and/or the navigation interface 308 of FIG. 3. The target location 406 can also be identified when received or input by an operator. The handover location optimizer 312 can determine the control handover zone 412 based on the communication range constraints 408 between the mobile control system 102 and the UAV 104. The control handover zone 412 may be located between the current location 416 of the mobile control system 102, the current location 422 of the UAV 104, and the target location 406 as further described and depicted in the example of FIG. 2. The handover location optimizer 312 can create a mobile control system path plan 428 for a mobile control system navigation system 430 and a UAV path plan 432 for a UAV navigation system 434. The mobile control system path plan 428 and the UAV path plan 432 may comprise a list of waypoints 414 that each includes a control handover waypoint 210 of FIG. 2 in the control handover zone 412 at the same time. The control handover waypoints 210A, 210B of FIG. 2 define planned locations to place the mobile control system 102 in control of the UAV 104 of FIGS. 1 and 2.

The UAV path plan 432 can be communicated to the ground control station 106 of FIGS. 1 and 2 prior to control handover. The path planning constraints 410 can be determined based on one or more of the avoidance zones 124 of FIGS. 1 and 2, where the path planning constraints 410 are also used to create the mobile control system path plan 428 and the UAV path plan 432 such that the avoidance zones 124 of FIGS. 1 and 2 are avoided in the respective path plans.

The initial mobile control system path plan 420 can be defined between the current location 416 of the mobile control system 102 and the target location 406 prior to control handover location consideration. The initial UAV path plan 426 may be defined between the current location 422 of the UAV 104 and the target location 406 prior to control handover location consideration. The handover location optimizer 312 can determine whether the initial mobile control system path plan 420 and the initial UAV path plan 426 meet the communication range constraints 408. The control handover waypoint 210A of FIG. 2 for the mobile control system 102 and the control handover waypoint 210B of FIG. 2 for the UAV 104 can be defined based upon respective locations in one or more of the initial mobile control system path plan 420 and the initial UAV path plan 426 where the communication range constraints 408 are expected to be met. One or more of the initial mobile control system path plan 420 and the initial UAV path plan 426 may be adjusted to form the mobile control system path plan 428 and the UAV path plan 432 based on determining that the initial mobile control system path plan 420 and the initial UAV path plan 426 do not meet the communication range constraints 408, e.g., no points along the path plans are in range at a desired point in time.

The handover location optimizer 312 may periodically re-compute the mobile control system path plan 428 and the UAV path plan 432 as the mobile control system 102 and the UAV 104 are in motion. Based on re-computing the mobile control system path plan 428 and the UAV path plan 432, the handover location optimizer 312 can determine whether a change in location or timing of the control handover waypoints 210A, 210B for the mobile control system 102 or the UAV 104 results therefrom. In creating and re-computing the mobile control system path plan 428 and the UAV path plan 432, the handover location optimizer 312 can ensure that the UAV 104 is scheduled reach the target location 406 prior to the mobile control system 102 reaching the target location 406 and after control of the UAV 104 is scheduled to be transferred to the mobile control system 102.

Technical effects include determining control handover waypoints for handing over control of a UAV from a ground control station to a mobile control system. The control handover waypoint selection can alter a path plan of the mobile control system and/or the UAV such that an efficient approach path to a target location is maintained for both the mobile control system and the UAV, while ensuring that control handover occurs with sufficient lead time for the UAV to reach the target location prior to the mobile control system but after the control handover.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of control handover planning for an unmanned aerial vehicle (UAV), the method comprising:
    determining, by a planning system, a current location of a mobile control system and a current location of the UAV;
    identifying a target location;
    determining a control handover zone based on a communication range constraint between the mobile control system and the UAV, the control handover zone located between the current location of the mobile control system, the current location of the UAV, and the target location; and
    creating a mobile control system path plan based on a location of the control handover zone and a UAV path plan based on the location of the control handover zone, wherein each of the mobile control system path plan and the UAV path plan includes a control handover waypoint in the control handover zone, the control handover waypoint defining a planned location to place the mobile control system in control of the UAV, wherein the mobile control system and the UAV are expected to reach their respective control handover waypoints at the same time.

2. The method of claim 1, further comprising:
    communicating the mobile control system path plan to a navigation system of the mobile control system.

3. The method of claim 1, further comprising:
communicating the UAV path plan to a control station that controls the UAV prior to control handover.

4. The method of claim 3, wherein the mobile control system receives control of the UAV from the control station based on the mobile control system and the UAV reaching the control handover zone.

5. The method of claim 1, further comprising:
determining path planning constraints comprising one or more avoidance zones; and
creating the mobile control system path plan and the UAV path plan based on the path planning constraints.

6. The method of claim 1, further comprising:
receiving an initial mobile control system path plan between the current location of the mobile control system and the target location;
receiving an initial UAV path plan between the current location of the UAV and the target location;
determining whether the initial mobile control system path plan and the initial UAV path plan meet the communication range constraint; and
defining the control handover waypoint for the mobile control system and the control handover waypoint for the UAV based upon respective locations in one or more of the initial mobile control system path plan and the initial UAV path plan where the communication range constraint is expected to be met.

7. The method of claim 6, further comprising:
adjusting one or more of the initial mobile control system path plan and the initial UAV path plan to form the mobile control system path plan and the UAV path plan based on determining that the initial mobile control system path plan and the initial UAV path plan do not meet the communication range constraint.

8. The method of claim 1, further comprising:
periodically re-computing the mobile control system path plan and the UAV path plan as the mobile control system and the UAV are in motion; and
based on re-computing the mobile control system path plan and the UAV path plan, determining whether a change in location or timing of the control handover waypoint for the mobile control system or the UAV results therefrom.

9. The method of claim 1, wherein creating the mobile control system path plan and the UAV path plan further comprises ensuring that the UAV is scheduled reach the target location prior to the mobile control system reaching the target location and after control of the UAV is scheduled to be transferred to the mobile control system.

10. The method of claim 1, wherein the planning system is onboard the mobile control system, the mobile control system comprises a helicopter, and the communication range constraint between the mobile control system and the UAV is based on line-of-sight communication between the mobile control system and the UAV.

11. A planning system for control handover planning for an unmanned aerial vehicle (UAV), the planning system comprising:
a processor; and
memory having instructions stored thereon that, when executed by the processor, cause the planning system to:
determine a current location of a mobile control system and a current location of the UAV;
identify a target location;
determine a control handover zone based on a communication range constraint between the mobile control system and the UAV, the control handover zone located between the current location of the mobile control system, the current location of the UAV, and the target location; and
create a mobile control system path plan based on a location of the control handover zone and a UAV path plan based on the location of the control handover zone, wherein each of the mobile control system path plan and the UAV path plan includes a control handover waypoint in the control handover zone, the control handover waypoint defining a planned location to place the mobile control system in control of the UAV, wherein the mobile control system and the UAV are expected to reach their respective control handover waypoints at the same time.

12. The planning system of claim 11, wherein the instructions further cause the planning system to:
communicate the mobile control system path plan to a navigation system of the mobile control system; and
communicate the UAV path plan to a control station that controls the UAV prior to control handover.

13. The planning system of claim 11, wherein the instructions further cause the planning system to:
determine path planning constraints comprising one or more avoidance zones; and
create the mobile control system path plan and the UAV path plan based on the path planning constraints.

14. The planning system of claim 11, wherein the instructions further cause the planning system to:
receive an initial mobile control system path plan between the current location of the mobile control system and the target location;
receive an initial UAV path plan between the current location of the UAV and the target location;
determine whether the initial mobile control system path plan and the initial UAV path plan meet the communication range constraint;
define the control handover waypoint for the mobile control system and the control handover waypoint for the UAV based upon respective locations in one or more of the initial mobile control system path plan and the initial UAV path plan where the communication range constraint is expected to be met; and
adjust one or more of the initial mobile control system path plan and the initial UAV path plan to form the mobile control system path plan and the UAV path plan based on determining that the initial mobile control system path plan and the initial UAV path plan do not meet the communication range constraint.

15. The planning system of claim 11, wherein the instructions further cause the planning system to:
periodically re-compute the mobile control system path plan and the UAV path plan as the mobile control system and the UAV are in motion; and
based on re-computation of the mobile control system path plan and the UAV path plan, determine whether a change in location or timing of the control handover waypoint for the mobile control system or the UAV results therefrom.

* * * * *